United States Patent [19]

Dittner et al.

[11] Patent Number: 4,726,549

[45] Date of Patent: Feb. 23, 1988

[54] ELECTROMAGNETICALLY ACTUATABLE PRESSURE MODULATOR

[75] Inventors: Adam Dittner, Höchstadt; Franz Fellner, Spardorf; Norbert Oberlack, Höchstadt; Erich Graf, Erlangen; Joachim Sauer, Erlangen; Ulrich Sieme, Erlangen, all of Fed. Rep. of Germany

[73] Assignee: FAG Kugelfischer Georg Schafer (KGaA), Fed. Rep. of Germany

[21] Appl. No.: 899,201

[22] Filed: Aug. 21, 1986

[30] Foreign Application Priority Data

Aug. 24, 1985 [DE] Fed. Rep. of Germany ....... 3530287
Feb. 1, 1986 [DE] Fed. Rep. of Germany ....... 3603074

[51] Int. Cl.$^4$ ............................ B60T 8/32; B60T 8/42
[52] U.S. Cl. .............................. 303/115; 188/181 R; 188/349; 303/61; 303/6 C
[58] Field of Search ................. 303/6 C, 22, 113–119, 303/24 F, 24 A, 24 R, 24 C, 61–63, 68–69, 100, 110, 15, 93; 188/349, 195, 181, 158; 251/129.2, 129.01–129.09, 129.15–129.19

[56] References Cited

U.S. PATENT DOCUMENTS

| | | | |
|---|---|---|---|
| 3,153,559 | 10/1964 | Schaffer | 303/115 |
| 3,549,210 | 12/1970 | Birge et al. | 303/115 |
| 3,640,589 | 2/1972 | Taniguchi | 303/115 X |
| 3,671,082 | 6/1972 | Stevens | 303/119 X |
| 3,689,121 | 9/1972 | Kawabe et al. | 303/6 C X |
| 3,690,736 | 9/1972 | Smirl et al. | 303/61 X |
| 3,695,732 | 10/1972 | Stelzer | 303/6 C X |
| 3,726,568 | 4/1973 | Krugler, Jr. | 303/115 |
| 3,729,237 | 4/1973 | Ishikawa et al. | 303/6 C X |
| 3,795,423 | 3/1974 | Shields et al. | 303/6 C |
| 3,804,468 | 4/1974 | Ishikawa et al. | 303/6 C |
| 3,847,449 | 11/1974 | Adahan | 303/61 X |
| 3,938,850 | 2/1976 | Pembleton et al. | 303/22 R X |
| 4,299,427 | 11/1981 | Fauck | 303/22 A |
| 4,312,543 | 1/1982 | Kubota | 303/6 C X |
| 4,358,163 | 11/1982 | Young | 303/22 R |
| 4,500,138 | 2/1985 | Mizusawa et al. | 303/6 C |
| 4,502,735 | 3/1985 | Kubota | 303/6 C X |
| 4,511,971 | 4/1985 | Dittner et al. | 364/426 |
| 4,602,702 | 7/1986 | Ohta et al. | 188/158 X |
| 4,626,038 | 12/1986 | Hayashi et al. | 303/113 X |
| 4,629,039 | 12/1986 | Imoto et al. | 303/119 X |

FOREIGN PATENT DOCUMENTS 2617726 11/1976 Fed. Rep. of Germany ...... 303/115
2648042 9/1978 Fed. Rep. of Germany .

Primary Examiner—Douglas C. Butler
Attorney, Agent, or Firm—Ostrolenk, Faber, Gerb & Soffen

[57] ABSTRACT

An electromagnetically actuatable pressure modulator for anti-locking brake systems utilizes a variable lever-type transmission interposed between a pressure relief piston of the modulator and the compression spring biased armature of an electromagnet whereby the non-linear force/air-gap relationship of the electromagnet is converted to a linear variation of the force applied to the pressure relief piston for moving same. When a predetermined maximum brake pressure is applied to the modulator, the latter automatically isolates the wheel cylinder from the master cylinder.

7 Claims, 4 Drawing Figures ns with the pressure modulator of the instant invention is constructed so that even in the event of disturbances in the system, the vehicle will be braked.

ELECTROMAGNETICALLY ACTUATABLE PRESSURE MODULATOR

BACKGROUND OF THE INVENTION

The present invention relates to an electromagnetically actuatable pressure modulator for antilocking brake systems for wheel driven vehicles.

For automobiles, motorcycles, and the like that are provided with an anti-locking brake system, during braking when a given deceleration threshold, for instance 12 m/s$^2$, is exceeded, an anti-locking device generates an electric signal to reduce the braking pressure until a lower second deceleration threshold, for instance 1−m/s$^2$, is reached. Now, the anti-locking device generates an electric signal to increase the braking pressure again and deceleration increases up to the first deceleration threshold. This build up and decrease of the brake pressure is effected by means of a pressure modulator.

Such pressure modulators are ordinarily controlled hydraulically by means of separate pumps. Such a construction has the disadvantage that the response time of the pressure modulator is strongly dependent on the viscosity of the hydraulic fluid and on the pressure differential present on it. In addition, it is costly to manufacture and precise regulation is very difficult if not possible. Furthermore, there is the danger that under unfavorable circumstances failure of the hydraulic pump will result in it no longer being possible for the vehicle to be braked sufficiently, if at all.

Federal Republic of Germany Patent No. 26 48 042 discloses a magnet-actuated modulator device used to brake a spinning wheel by acting in a manner similar to that of a locking differential. By periodic excitation of the magnet coil, the armature thereof is used to pump hydraulic fluid from a pump chamber into the wheel cylinder of the spinning wheel, thus braking the latter. Such a modulator is not suitable for regulating the braking pressure in an anti-locking device since neither the relief nor the buildup of braking pressure takes place in defined fashion.

SUMMARY OF THE INVENTION

The object of the instant invention is to provide an electromagnetically actuatable pressure modulator of compact lightweight construction which controls the braking pressure in the wheel cylinder in a well-defined and reproducible manner when the pressure acting on it from the master cylinder is greater than the pressure which is necessary for locking of the wheel.

This object is achieved by utilizing a modulator having a pressure relief piston that is operatively connected by means of a variable lever-type transmission with the armature of an electromagnet in such a manner that a linear force acts on the pressure relief piston from the non-linear force of displacement of the armature. The pressure relief piston is operatively connected with a valve so that when a predetermined maximum braking pressure is exceeded the wheel cylinder is disconnected from the master cylinder thereby limiting pressure applied to the wheel cylinder.

Master cylinder pressure is determined by sensing the position of the pressure relief piston, which is biased by a spring in one direction. Such position sensing may be done by a sensing device directly coupled to the piston, or by a remote pressure-sensitive device against which the spring presses.

Furthermore, the pressure modulator of the instant invention is constructed so that even in the event of disturbances in the system, the vehicle will be braked.

BRIEF DESCRIPTION OF THE DRAWINGS

This invention will now be described in detail with reference to the accompanying drawings, in which.

DESCRIPTION OF THE PREFERRED EMBODIMENTS

Figure 1:
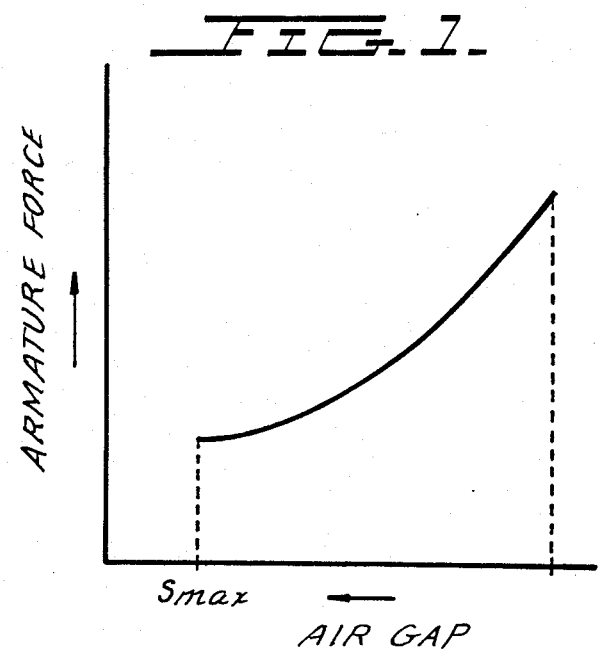
FIG. 1 is a force/air gap diagram of an electromagnet.

From FIG. 1 it is seen that the displacement force F of the armature 6 (FIG. 3) for compact electromagnet 5 does not change linearly with respect to air gap S. It has been found that in order to obtain superior performance of a braking system having a pressure modulator 1, it is necessary to achieve a controlled and reproducible build up and decrease in brake pressure. That is, the force on the pressure relief piston 2 of pressure modulator 1 should vary linearly with the change in volume of modulator chamber 14 that is controlled by the displacement of pressure relief piston 2.

Figure 2:
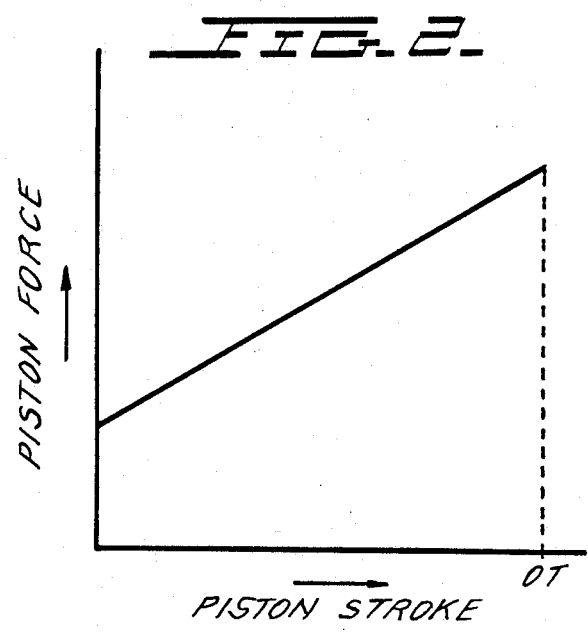
FIG. 2 is a diagram of the required variation of the force with respect to the volume of a chamber controlled by the pressure relief piston of the modulator illustrated in FIG. 3.

A linear force/displacement characteristic (FIG. 2) for piston 2 is obtained by interposing variable lever or force transmission means, consisting of roller 7 riding on cam 8, between armature 6 and piston 2. Cam 8 acts as a variable lever by being developed as a curved surface whose slopes are so dimensioned that the course of the non-linear force/displacement characteristic of armature 6 (FIG. 1) is converted into the course of the linear force/displacement force characteristic of the piston 2.

Modulator 1 also includes body 99 having bore 98 wherein piston 2 is slidably mounted. Chamber 14 is that portion of bore 98 above piston 2. Above bore 98, body 99 is also provided with cavity 96 wherein ball valve 3 and compression spring 97 are disposed. Inlet 95 connects cavity 96 to the upper end of bore 98 and spring 97 biases valve 3 toward its closed position wherein inlet 95 is closed. Hydraulic line 94 connects master cylinder 15 to cavity 96 and hydraulic line 93 connects chamber 14 to brake 16, the latter being engageable with rotating wheel 92 for stopping rotation thereof.

Roller 7 engages the bottom of piston 2 and extension 91 at the left end of armature 6, the latter being disposed to move at right angles to the path of movement for piston 2. Enlargement 89 at the free end of elongated projection 88 that extends from the right end of armature 6 is engaged by one end of compression spring 9 disposed within housing 87. The latter is fastened to stationary field piece or core 86 of magnet 5. Magnet coil 12 is connected to the output of comparator 17 which has one input connected to the output of set point value guide or generator 40, and has another input that is connected to the output of position monitoring device 4 whose input is driven by piston 2. When braking is not taking place, piston 2 is in the upper dead center position of FIG. 3 wherein piston projection 84 extends upward through inlet 95 and engages valve 3 to open same.

The initial force of compression spring 9 is selected so that piston 2 is only displaceable in the direction of its lower dead center position if the hydraulic pressure force acting on cylinder 2 is approximately the maximum braking force which leads to the locking of wheel 95 (for instance with a braking pressure of 60 bar). As piston 2 moves downward, projection 84 thereof releases ball valve 3 and the latter is urged by spring 96 to close inlet 95 thereby isolating wheel cylinder 16 from master cylinder 15.

When armature 6 is attracted by the excitation of the coil 12, the equalization chamber or space 14 is increased in size, master cylinder 15 is disconnected from the wheel cylinder 16 by means of ball valve 3, and the effective brake pressure in wheel cylinder 16 is reduced. An increase in the braking force takes place in the corresponding reverse manner. This cycle takes place within the above-described rotation deceleration thresholds of 12 m/s$^2$ and 10 m/s$^2$, respectively, until the vehicle has come to a stop or until the braking pressure generated by master cylinder 15 is below the locking pressure of the wheel 92.

Position measuring system 4 driven by piston 2 applies a continuously increasing or decreasing "actual" signal, corresponding to the change in volume of chamber 14, to one input of comparator 17, which compares it with the set point signal given off by the electronic system (not shown) of which set point value guider 40 is a part.

Figure 3:
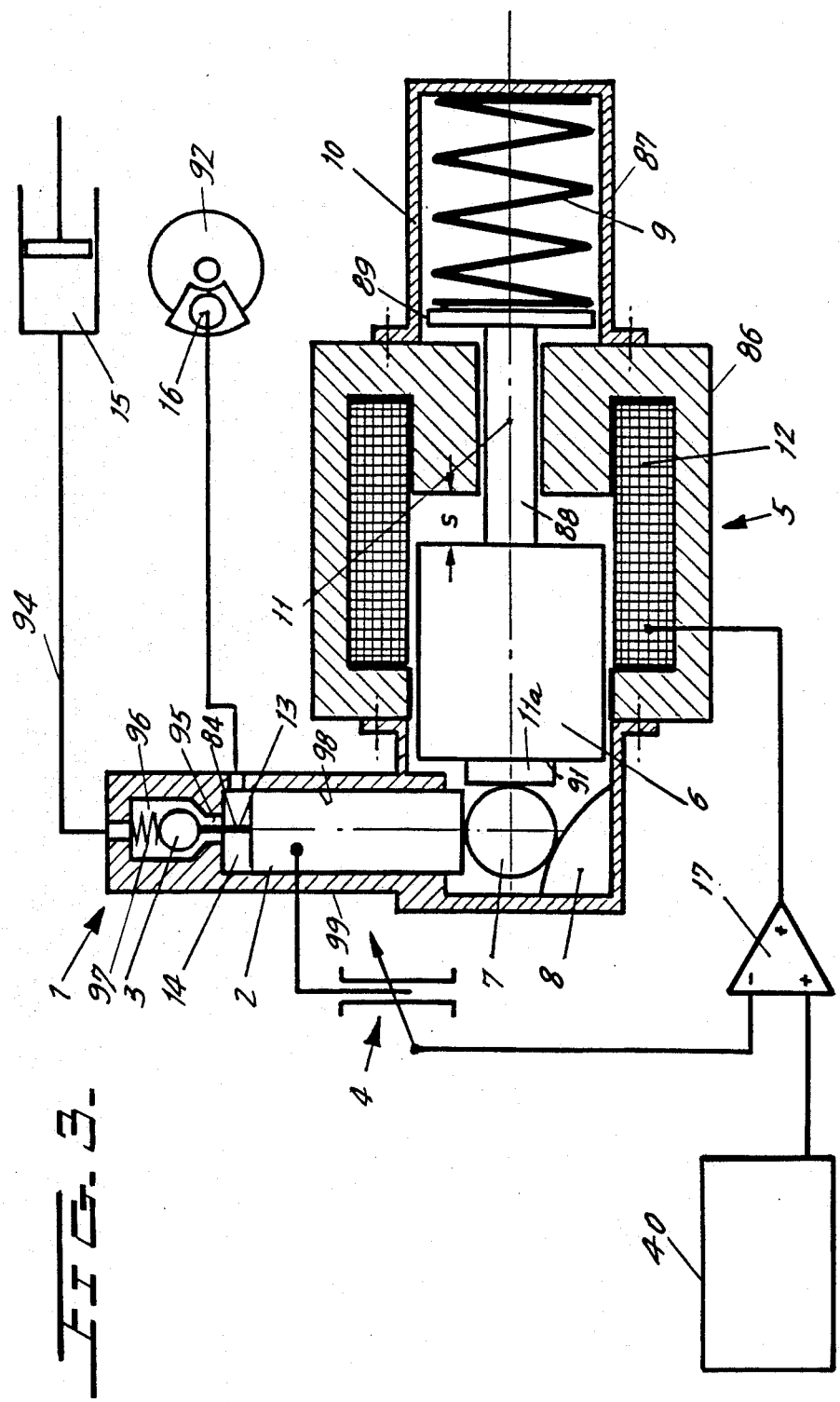
FIG. 3 is a longitudinal section through an electromagnetically actuatable pressure modulator constructed in accordance with teachings of the instant invention.
Figure 4:
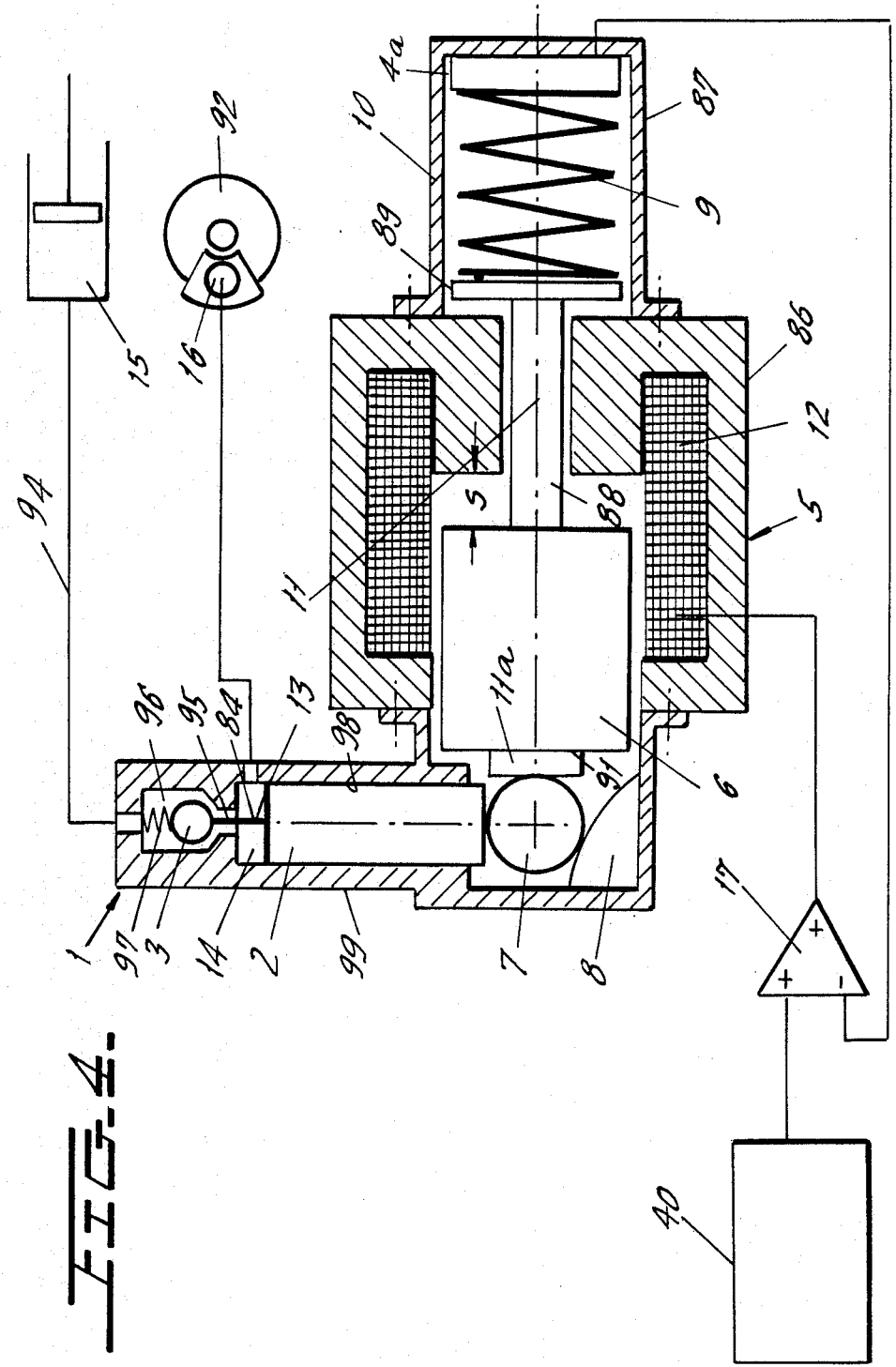
FIG. 4 is a view similar to FIG. 3, but shows a remote device for position sensing of a piston rather than a device directly coupled to the piston.

As shown in FIG. 4, FIG. 4 shows common reference numerals with FIG. 3 for similar parts, and, except for substitution of element 4a for element 4, is the same as FIG. 3.

Position measuring system 4 may be replaced by a piezoquartz element 4a being disposed behind compression spring 9. Force applied to element 4a is related to the volume of chamber 14. Hence, signals generated by force applied to element 4a and fed to an input of comparator 17 are indicative of the position of piston 2. These signals may be processed to determine the rate at which the volume of chamber 14 is changing. The advantage of using piezoquartz element 4a is that, as a passive element, no electric energy need be fed to it from the outside.

For non-controlled braking before deceleration reaches the upper deceleration threshold of 12 m/s$^2$, as long as the pressure which comes from master cylinder 15 and acts in pressure relief chamber 14 is greater than a predetermined amount, say 60 bar, pressure relief piston 2 is pushed against the initial force of compression spring 9 in the direction towards lower dead center. During this movement of piston 2 its projection 84 comes out of engagement with valve 3 so that the latter closes inlet 95 and master cylinder 15 is disconnected from wheel cylinder 16. Thus, even in the event of panic braking, during which pressure of up to 150 bars can easily be reached in master cylinder 15, only the 60 bar intended pressure is present at wheel cylinder 16. After suitable relief of master cylinder 15, pressure relief piston 2 is pushed back into its basic upper dead center position by compression spring 9 and projection 84 engages valve 3 to open inlet 95.

Upon controlled braking, a typical anti-locking device (not shown) recognizes that braking pressure at wheel cylinder 16 will cause locking of wheel 92 so that magnet coil 12 is energized and armature 6 is attracted to close gap S.

Electromagnet 5 is constructed so that its variation of force is fundamentally larger in amount than the characteristic of compression spring 9, and the different slopes of the transmission 8 are adapted to the sum of the non-linear armature and spring forces so that a linear variation of force acts on pressure relief piston 2.

At the moment armature 6 is attracted, pressure relief piston 2 is moved in the direction of its lower dead center by the force of the pressure in chamber 14 which acts on piston 2. During this movement, projection 95 comes out of engagement with ball valve 3 whereby the latter disconnects master cylinder 15 from pressure relief space or chamber 14 and thus from wheel cylinder 16.

After valve 3 closes, as pressure chamber 14 increases in size, the pressure acting on the wheel cylinder 16 decreases and the actual value of the change in volume of chamber 14 is compared via the path measuring system 4 or piezoquartz element 4a with the set-point value of pressure reduction and coil 12 is energized accordingly.

If deceleration of wheel 92 drops below the second deceleration threshold (10 m/s$^2$), the braked wheel is again accelerated, the anti-locking device (not shown) gives off a signal to increase the braking pressure again and excitation of coil 12 is reduced. As a result, compression spring 9 pushes the armature 6 back to the left, so that pressure relief piston 2 is pushed in the direction of its upper dead center position by means of armature extension 91 engaging roller 7 that rolls along cam disk 8. By reducing the size of pressure chamber 14, the braking pressure in the wheel cylinder 16 is increased. All the while the actual value of the change in volume of chamber 14 is compared with the set-point value of the increase in brake pressure, and coil 12 is excited accordingly. When the upper deceleration threshold (12 m/s$^2$) is again reached, a new control cycle commences.

The continuous buildup and decrease of the pressure at wheel cylinder 16 takes place until the vehicle has come to a stop or the pressure acting from master cylinder 15 on valve 3 is less than the pressure in pressure chamber 14.

When piezoquartz element 4a is utilized, it gives off voltage signals corresponding to the rate of change of the force acting on it. There signals are sent to value comparator 17 to excite electromagnet 5 accordingly. For details of comparator 17 and other electronic elements of an anti-locking braking system see copending U.S. patent application Ser. No. 899,208, filed on even date herewith, entitled "Method and Apparatus for the Anti-Lock Braking of an Automotive Vehicle", and assigned to the assignee of the instant invention.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. Hydraulic braking apparatus for a wheelsupported land vehicle; said apparatus including:

operator actuated first means for generating hydraulic pressure in said apparatus;

hydraulically operated second means for exerting pressure to stop rotation of a wheel means;

third means defining a passage for communicating hydraulic pressure from said first means to said second means, said passage including an expandable chamber having an inlet for fluid flow between said chamber and said first means;

said second means communicating with said chamber independently of said inlet;

a valve and first biasing means urging said valve in a direction to close said inlet;

a moveable section partially defining said chamber, and second biasing means for urging said movable section in a first direction to reduce the volume of said chamber and toward operative engagement with said valve to operate same in a direction to open said inlet;

fourth means to generate an opposing force that acts against force produced by said second biasing means; said fourth means including an electromagnet with a movable armature;

a force transmitting mechanical device interposed between said armature and said movable section; said mechanical device being operatiavely constructed to transform a non-linear force/displacement characteristic of said armature into movement of said movable section in said second direction with a generallly linear force/displacement characteristic;

a control means operatively connected to said fourth means to activate and deactivate same under predetermined conditions of deceleration for wheel means that is to be stopped by said second means;

said fourth means when activated generating said opposing force thereby permitting pressure within said chamber to operate said movable section in a second direction, opposite to said first direction; operation of said movable section in said second direction serving to expand said chamber and move said movable section away from operative engagement with said valve permitting the latter to close said inlet and isolate said chamber from said first means to limit pressure applied to said second means.

2. Hydraulic braking apparatus as set forth in claim 1, in which said second biasing means exerts a force on said movable section that is overcome by pressure in said chamber acting through said movable section when said pressure within said chamber reaches a predetermined level which is below brake locking level, whereby said pressure within said chamber moves said movable section in said second direction permitting said valve to close said inlet and by so doing limiting pressure within said chamber from rising above said predetermined level even when pressure exerted by said second means exceeds said predetermined level.

3. Hydraulic braking apparatus as set forth in claim 1, also including a fifth means for generating a signal related to the position of said movable section, with said signal being fed to an input of said control means.

4. Hydraulic braking apparatus as set forth in claim 3, in which the fifth means includes a piezoelectric element that generates a signal related to pressure exerted thereon by said second biasing means.

5. Hydraulic braking apparatus as set forth in claim 1, in which the mechanical device includes a variable lever type transmission.

6. Hydraulic braking apparatus as set forth in claim 1, in which the mechanical device includes cam means.

7. Hydraulic braking apparatus as set forth in claim 5, in which the movable section under conditions of non-braking is normally in a basic position, and said second biasing means exerts a force that is related in a predetermined manner to the product of a predetermined maximum braking pressure times the slope of that portion of the transmission which is active at the time the movable section is in said basic position.

* * * * *